June 5, 1951

F. T. MURRAY 2,555,596

TRANSITION CURVE PLOTTER FOR ROADS,
RAILWAYS, AND OTHER PURPOSES

Filed Sept. 10, 1948

INVENTOR
Francis T. Murray

By Watson, Cole, Grindle & Watson

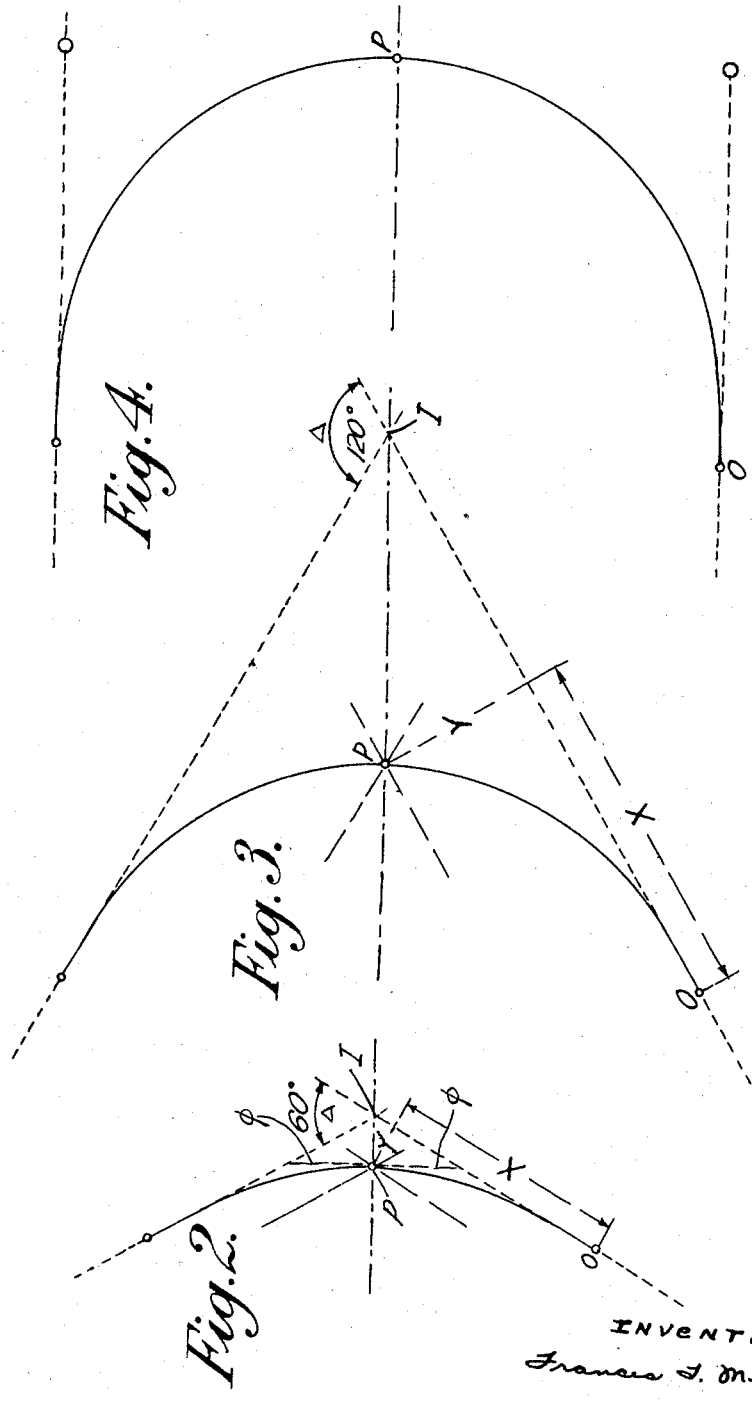

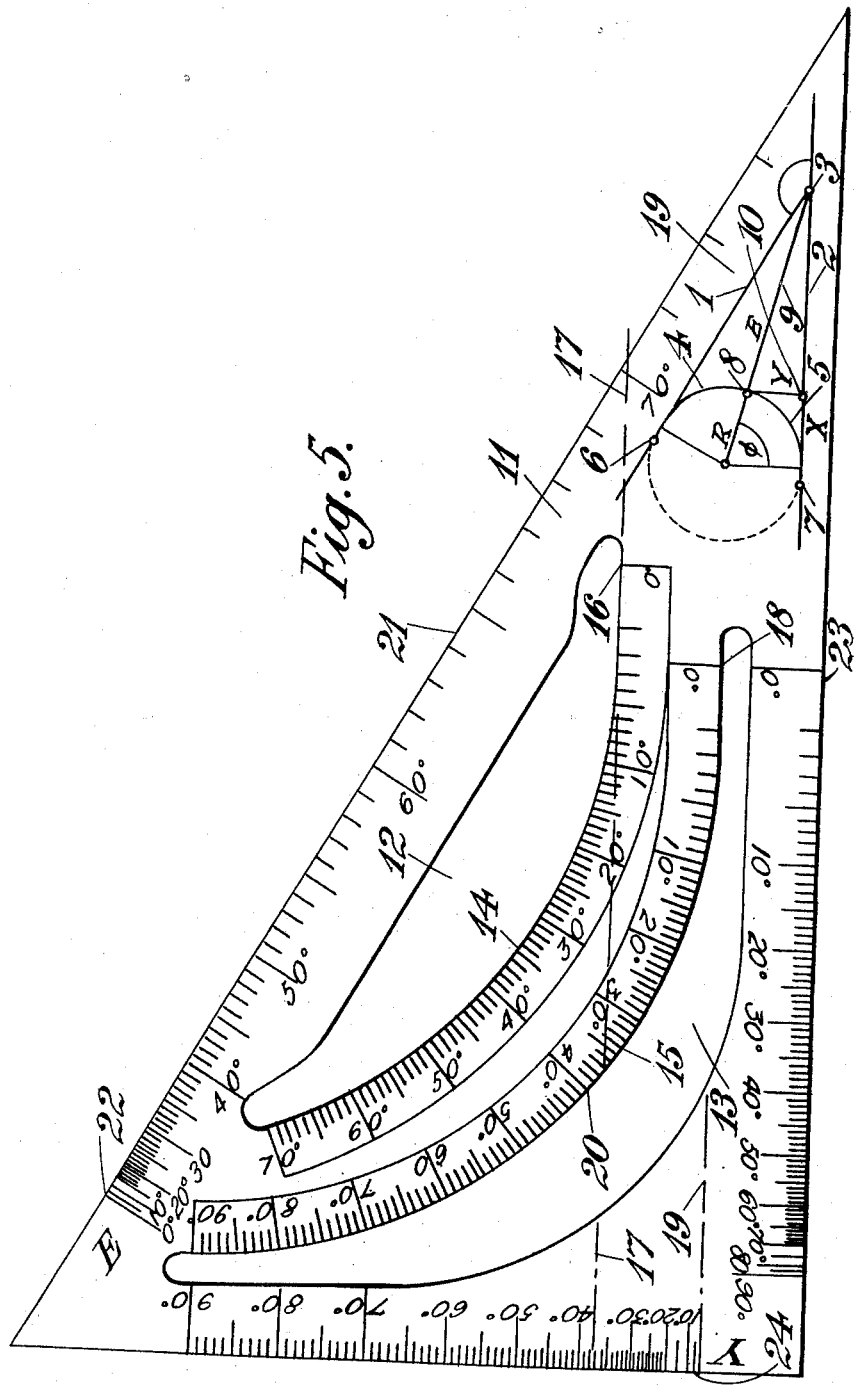

Patented June 5, 1951

2,555,596

UNITED STATES PATENT OFFICE 2,555,596

TRANSITION CURVE PLOTTER FOR ROADS, RAILWAYS, AND OTHER PURPOSES

Francis Thomas Murray, Padstow, Cornwall, England

Application September 10, 1948, Serial No. 48,567
In Great Britain September 25, 1947

4 Claims. (Cl. 33—1)

This invention comprises improvements in or relating to transition curve plotters for roads, railways and other purposes. Such plotters are employed for drawing transition curves in their proper relation to straight lines, circles or other transition curves.

The purpose of a transition or easement curve is to provide a harmonious connection between a curve of large radius and a curve of shorter radius, without any sudden change in radius of curvature. Where a straight line (which is a circle of infinitely long radius), is joined to a circle, it is the orthodox method for the radius of curvature of the transition curve to decrease continuously from infinity to the radius of the circle at the point on it where they join. This involves that the transition curve approaches the circle from the outside, and therefore the circle is "shifted"; that is to say, the circle can no longer occupy a position where it is tangential to the straight line but is separated from it by a distance usually called the "shift." It would be much more convenient in joining a straight line to a circle by means of a transition curve if "shift" could be avoided, and it is an object of this invention to provide a plotter which enables a straight line to be connected harmoniously by means of a transition curve to a circle that is tangential to it.

According to the present invention, a plotter for the purpose described is provided with an edge affording a transition curve which, while progressively diminishing in radius from its point of origin for a portion of its length, thereafter increases again in radius. Such a transition would approach the "unshifted" circle from the inside and would be connected to the circle at a point on it where its radius of curvature was the same, or approximately the same as that of the circle. This invention, in one form, includes a portion of the "unshifted" circle as a continuation of the transition from the point where their radii are equal, the whole being treated as one continuous curve.

While many curves might be devised to give the required results the parabola can be used as a transition curve for the purposes of the present invention. Its radius decreases from infinity at a gradually diminishing rate until for an instant a constant radius slightly less than that of the "unshifted" circle is reached, whence its radius of curvature starts to increase at a gradually increasing rate. From the point at which the radius of the parabola is equal to that of the "unshifted" circle the remainder of the parabola is of no use for the purposes of this invention. Instead, the "unshifted" circle is joined to the parabola, and the curve that forms the basis of this invention consists of a combination of the parabola, or other suitable transition, and the "unshifted" circle joined together at a point where their respective radii are equal, or approximately so.

The object of a transition, or easement, curve is to ease the connection between a straight line and a circle, but always in road or railway location the employment of a circular curve with a short transition is preferred to a wholly transition curve, and indeed insisted upon by regulations. Except where the total angle turned is very small, therefore, a curve that is part transition and part circle is employed, and the design and setting out (or location) of such a combination of curves is a complicated operation. The curve that forms the basis of this invention, being in itself part transition and part circle, provides all that is required for road and railway location purposes with the simplicity of a single curve. The cubic parabola has been selected to provide the transition portion of the combined curves in the drawings illustrating the present specification.

The following is a description by way of example of certain curves which illustrate the employment of the invention and of a plotter constructed in accordance with the invention. In the accompanying drawings Figure 1 is a diagram showing a curve to be used in accordance with this invention;

Figure 2 is a diagram showing two such curves joining two straight lines meeting at an obtuse angle;

Figure 3 is a similar diagram where the lines meet at an acute angle;

Figure 4 shows a case where two such curves connect two parallel lines; and

Figure 5 is an illustration of the plotter.

Figure 1:
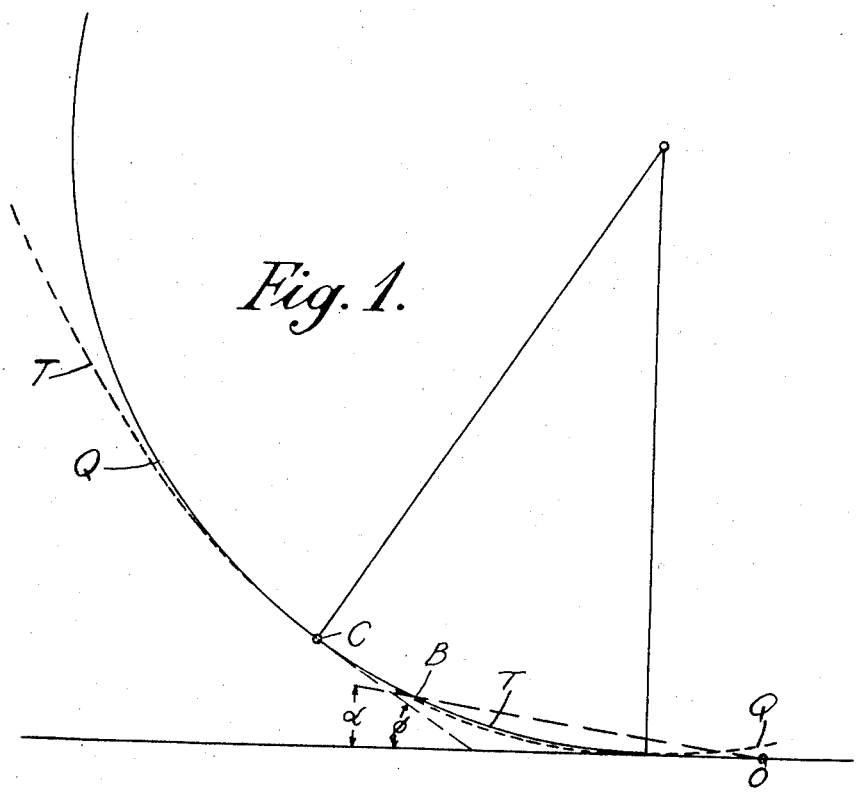

Analysing a cubic parabola (T in Figure 1) in terms of the deflection angle $\alpha$ measured in relation to its base line from its point of origin O, its radius of curvature continues to decrease until $\alpha$ is about 8°.29′ (Point B, Figure 1), after which it gradually increases. When $\alpha$ has increased to about 12°.57′ (Point C, Figure 1), and the tangential angle $\phi$ of the cubic parabola, that is to say the angle that a tangent to the curve at C makes with the base line, is approximately 34°.36′, the curve coincides with an imaginary unshifted circle Q tangential to the base line. At this point according to the present invention the parabola is discontinued and the curve is continued along the "unshifted" circle.

Figures 2, 3 and 4 show three symmetrical curves according to this invention drawn between pairs of tangents or base lines having deviation angles Δ of 60°, 120° and 180° respectively. The same scale of curve is used in each case. In Figure 2 the tangential angle φ (half Δ), is less than 34°.36' and therefore the curve is parabolic throughout. In Figures 3 and 4 the curves are part parabola and part circle. But the curve drawn with the aid of the plotter is exactly the same in all three cases except that varying lengths of the same curve are used.

Figure 5 is a representation of a plotter, which comprises a triangular celluloid sheet 11 out of which are cut two openings 12, 13. The opening 12 is shaped along the edge 14 to provide a combined curve consisting of a transition the radius of curvature of which first decreases and then increases, in this case a cubic parabola, and a circle the circumference of which, if visible, would be normal to the base line 17 on which the curve has its origin 16, the material of the plotter being so disposed as to form a concave curve, whereas the opening 13 is shaped along the edge 15 to exactly the same curve in a convex form, the origin of which 18 is on base line 19 also marked on the plotter. Which edge, 14 or 15, is employed by the draughtsman will depend on his convenience. The edges 14 and 15 are parabolic as far as the point where the tangential angle is about 35°; beyond it they are continued as a circular arc in a similar way to the curve drawn in Figure 1, the portion T of which is parabolic and the portion Q, beyond the point C, circular.

Each of the curves 14, 15 is provided around its edge with graduations which are marked in terms of the angles made by tangents to the curve with the base line 17, 19; that is to say for example at the point 20 on the curve 15, which is marked with the angle 40° in the drawing, the tangent to the curve will be at 40° to the base line 19, and so on for all other graduations.

It will be observed that a diagram is inscribed on the corner of the set-square 11 which shows a typical curve problem that may be solved by this plotter. The two tangents or base lines 1, 2 intersect at the point 3 with an external deviation angle Δ. Two similar curves 4, 5 are required to connect the tangents, each starting from a point of origin 6, 7 on its own tangent or base line 1, 2 and meeting at the mid-point 8 situated on a line 9, marked E, bisecting the internal angle made by the two tangents. It is assumed that the angle Δ is known and from that φ the tangential angle of the curve at 8, that is to say the angle that a tangent to the curve at that point makes with either base line, may be calculated. φ equals half Δ. It will be observed that E is the length from the curve at 8 to the point of intersection 3 of the normal to the curve with the base line 1 or 2.

Y is the perpendicular distance of the point 8 from either tangent, and X is the distance measured along the tangent from the point of origin 6, 7 to the point 10 at which the vertical line Y is erected. It will be observed that if the distance E is known and measured along the bisector 9 from point of intersection 3, the mid-point of curve 8 can be immediately fixed.

The diagonal edge 21 of the set-square 11 which forms the plotter carries a scale marked E beginning at the point marked O (reference number 22), which scale shows by its divisions the lengths of normals to the curve measured from the curve to the base line for points on the curve in terms of the angle φ that a tangent at that point makes with the base line 17 or 19. That is to say for example (considering Figure 2), the external distance E corresponding to a length of the curve 14, 15 that would be required if the external deviation angle were 60° is the same as the distance on the scale 21 from the point 22 to the graduation which is marked 30°. It will be seen that Figure 2 has been drawn for this condition and the distance P—I on this figure is equal to E.

In order to draw the curve the E distance will be measured direct from the plotter by placing the edge 21 along the line IP with the mark 22 at the point of intersection I of the two tangents and making a mark P at the 30° graduation. This will be the mid-point of the curve. Place the curved edge 14 of the plotter with the 30° graduation at P and move the instrument until the base line 17 coincides with the tangent, mark the point of origin O at 16 and draw the curve by running a pencil along the edge 14 between the two points O and P. The operation will have to be repeated between P and the other tangent, using whichever curved edge 14, 15 that is most convenient.

In Figure 3 the external deviation angle Δ is 120°, therefore the tangential angle φ at P is 60°. The same method would be utilised to draw the curve but the 60° graduation would be used. In Figure 4 the external deviation angle Δ being 180°, the point of intersection is not available; obviously, therefore, the point P will have to be assumed and the curve drawn after placing the curved edge 14, 15 of the plotter with its 90° graduation at P and making the appropriate base line 17, 19 to coincide with the two tangents in turn.

In the aforesaid diagram inscribed on the plotter (Figure 5) the horizontal distance of the projection of the mid-point 8 of the curve measured along the tangent, or base line, 2, taken from the point of origin 7, is marked X. On one of the other edges of the plotter there is a scale 23 which shows the values of the distances X in terms of the angular marking of corresponding points on the curve. It will be noted that the origin 23 of the scale X is projected from the origin 18 of the curve 15, and therefore when this particular curve is being employed the distances X come in their natural relationship to the curve 15.

Similarly the vertical heights Y above the base line 19 of the various points on the curve 15 are projected on to a scale 24 on an edge of the plotter at right angles to the scale 23. The scales 23, 24 of course apply also to the curve 14, but the scales are not marked on the plotter in the same relationship to the curve 14 as they are able to occupy in relation to the curve 15.

In order to explain the use of the scales 23, 24 as an alternative means of drawing the curve it is necessary again to refer to Figures 2 and 3. If a straight line is drawn parallel to each of the tangents in turn and at a distance from them equal to the Y distance measured on the scale 24 of the plotter corresponding to the value of the tangential angle φ, that is 30° for Figure 2 and 60° for Figure 3, the mid-point P of the curve will be at the intersection of the two lines in each case. If the point P is then projected on to the tangent and the corresponding X distance measured with the scale 23 from the projected point along the tangent, the point of origin O will be located. The curve may now be drawn by placing the plotter with origin 16, 18 at O, and the curved edge 14, 15 with its correct graduation, 30° for Figure 2 and 60° for Figure 3, at P, and running a pencil along the curved edge between those two points O and P.

In practice a number of plotters of similar shape and made to different scales are provided and the draughtsman selects a plotter for use which is of the scale best suited for his purpose.

I claim:

1. A plotter consisting of sheet material having marked thereon a base line an edge affording a transition curve which at one end has a point of origin where it is tangential to the base line and is of substantially zero curvature and which proceeds from the point of origin diverging from the base line with gradually diminishing radius of curvature over a portion of its length and thereafter increases in radius of curvature until a point is reached where the curve coincides with an imaginary circle tangential to the base line whereafter it is continued along said circle.

2. A plotter having a curved edge as set forth in claim 1, said curved edge being graduated with divisions denoting the angle made by a tangent to each point of the curved edge with the base line.

3. A plotter as claimed in claim 2, having a straight edge graduated with divisions denoting the length of external distances from each point on the curved edge to the base line measured along a line normal to the curved edge.

4. A plotter as claimed in claim 3, having a further straight edge graduated with divisions denoting for each point on the curved edge the perpendicular distance from said point to the base line.

FRANCIS THOMAS MURRAY.

REFERENCES CITED

The following references are of record in the file of this patent:

UNITED STATES PATENTS

| Number | Name | Date |
| --- | --- | --- |
| 601,630 | Chase | Apr. 5, 1898 |
| 992,371 | Mather | May 16, 1911 |
| 2,245,915 | Hartrampf | June 17, 1941 |
| 2,507,073 | White | May 9, 1950 |

FOREIGN PATENTS

| Number | Country | Date |
| --- | --- | --- |
| 4,290 | Great Britain | 1889 |
| 565,873 | Great Britain | Dec. 1, 1944 |
| 585,204 | Great Britain | Jan. 31, 1947 |

OTHER REFERENCES

Pages 307, 308, 310 and 312 to 313b of "A Catalogue of Drafting and Surveying Supplies," 15th Edition, of Eugene Dietzgen Co., Chicago, Ill. Copyright 1946.